United States Patent
Dittrich et al.

(10) Patent No.: US 9,125,151 B2
(45) Date of Patent: Sep. 1, 2015

(54) TIME SYNCHRONIZATON OF NETWORK SUBSCRIBERS

(75) Inventors: Steffen Dittrich, Erlangen (DE); Harald Karl, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 190 days.

(21) Appl. No.: 13/877,079

(22) PCT Filed: Sep. 28, 2011

(86) PCT No.: PCT/EP2011/066826
§ 371 (c)(1),
(2), (4) Date: Mar. 29, 2013

(87) PCT Pub. No.: WO2012/041887
PCT Pub. Date: Apr. 5, 2012

(65) Prior Publication Data
US 2013/0189922 A1    Jul. 25, 2013

(30) Foreign Application Priority Data
Sep. 29, 2010    (DE) .......................... 10 2010 041 674

(51) Int. Cl.
*H04B 7/19* (2006.01)
*H04W 56/00* (2009.01)
*H04J 3/06* (2006.01)
(Continued)

(52) U.S. Cl.
CPC ............ *H04W 56/001* (2013.01); *G04R 20/02* (2013.01); *H04J 3/0644* (2013.01); *H04B 7/2125* (2013.01); *H04J 3/0667* (2013.01)

(58) Field of Classification Search
CPC .................................................. H04W 56/001
USPC .................................. 455/13.2, 12.1, 11.1, 7
See application file for complete search history.

(56) References Cited

U.S. PATENT DOCUMENTS 7,190,703 B1    3/2007    Heitmann
2009/0016475 A1    1/2009    Rischar et al.
(Continued)

FOREIGN PATENT DOCUMENTS

DE    102010041674    3/2012
WO    2007/000498 A1    1/2007

OTHER PUBLICATIONS

Office Action dated Jan. 5, 2015 in corresponding Chinese Patent Application No. 201180047067.5.
Symmetricom In.: "SyncServer S300", pp. 1-8.
(Continued)

*Primary Examiner* — Sanh Phu
(74) *Attorney, Agent, or Firm* — Staas & Halsey LLP

(57) ABSTRACT

A more simple and robust time synchronization of network subscribers compared to solutions known in the state of the art is provided by a device for time synchronization of network subscribers of a network based on satellites, having at least one satellite antenna connected to a receiving unit receiving a satellite signal containing time information. An electronic system that obtains the time from the satellite signal is connected to a time server with a network connection for the synchronization of the network subscribers using a network protocol. The complexity of the device is reduced and the common coaxial infrastructure between the receiving unit and the time server is removed for the satellite signal and replaced by a robust infrastructure.

4 Claims, 1 Drawing Sheet

(51) Int. Cl.
*G04R 20/02* (2013.01)
*H04B 7/212* (2006.01)

(56) References Cited

U.S. PATENT DOCUMENTS

2009/0168808 A1* 7/2009 Cho et al. .................. 370/503
2009/0231191 A1   9/2009 Wu et al.

OTHER PUBLICATIONS

Office Action for German Patent Application No. 102010041674.6; dated Apr. 8, 2011.
International Search Report for PCT/EP2011/066826; mailed Dec. 16, 2011.

* cited by examiner

TIME SYNCHRONIZATON OF NETWORK SUBSCRIBERS

CROSS REFERENCE TO RELATED APPLICATIONS

This application is the U.S. national stage of International Application No. PCT/EP2011/066826, filed Sep. 28, 2011 and claims the benefit thereof. The International Application claims the benefit of German Application No. 102010041674.6 filed on Sep. 29, 2010, both applications are incorporated by reference herein in their entirety.

BACKGROUND

Described below is an apparatus for the time synchronization of network subscribers of a network based on satellites.

An apparatus of this type is intended for applications in which satellite systems such as for instance the US's GPS system, Russia's GLONASS, China's COMPASS, Europe's GALILEO or similar systems are used to synchronize the application in relation to clock time or reference time using the time data available from these systems, it being possible for this synchronization of the system normally to take place via an Ethernet infrastructure.

Until now, such systems for time synchronization based on satellites are achieved in at least two phases: a first phase consists of a satellite antenna and, if necessary, an integrated high frequency amplifier for the satellite signal. This phase is typically mounted externally. This signal is then fed inwards into the application via separate wiring (typically coaxial). A second phase is mounted internally (typically, in a switch cabinet). The satellite signal (in certain circumstances, amplified) is fed to it via the wiring. This phase contains the electronic system for capturing the required time from this signal, and either contains a network connection directly or makes available the time of another phase with a network connection. Synchronization of the application was achieved via the network connection using network protocols.

SUMMARY

A more simple and more robust time synchronization of network subscribers compared to the solutions known in the prior art is achieved by an apparatus for the time synchronization of network subscribers of a network based on satellites, that has at least one satellite antenna and a receiving unit for receiving a satellite signal containing the time data, an electronics system for capturing the time from the satellite signal and a time server with a network connection for the synchronization of the network subscribers using a network protocol.

The solution integrates all phases required for the time synchronization in one unit.

Rather than phase 1, as described above, this integrated unit is directly mounted externally, the network infrastructure extending to the assembly site. Therefore all necessary phases, in other words both the electronics system in order to obtain the time data from a satellite signal, and also the electronics system in order to operate a network connection and synchronize the same thereover, are integrated directly into the device which contains the satellite antenna. The complexity of the device is herewith reduced to simply one component on the one hand and the coaxial infrastructure is no longer required for the satellite signal on the other hand and can be replaced by a more robust infrastructure.

In an advantageous form of the embodiment the network is embodied as an Ethernet.

Such a device can then be operated for instance directly on the system switch which is already available. Field assembly for Ethernet infrastructure is achieved excellently by the spread thereof. Coaxial infrastructure is typically delivered preassembled and is thus very inflexible in response to individual requirements.

With coaxial infrastructure, significant restrictions exist with regard to admissible levels of attenuation, and thus with regard to achievable distances, due to the operating frequency of the satellite signals. Greater distances are either possible through outlay on more expensive wiring or additional devices (amplifiers). Internet infrastructure is required as distances that comply with standards (100 m for 100 Base-T) that are sufficient in the applications can be achieved.

Coaxial infrastructure is also more sensitive with regard to EMC. Such systems are either not readily available and/or have a high error risk. In time-sensitive applications, systems based on Ethernet are superior to classic coaxial systems.

Ethernet infrastructure also has better properties in relation to galvanic separation than coaxial infrastructure. This is achieved there by transformers. Coaxial infrastructure, on the other hand, has no implicit galvanic separation.

In a further advantageous embodiment, Power-over-Ethernet can be used for a power supply. This saves on a separate power supply which is naturally conceivable but not expedient.

In a further advantageous embodiment, the time server is embodied as an NTP server. The integrated antenna unit thus operates as an NTP server (Network Time Protocol) and can be interfaced to the Ethernet infrastructure in a pre-assembled manner. An advantage of this solution is that no additional time server or protocol converter is required within the application.

In a further advantageous embodiment, the time server is embodied as a highly precise time server. In this way even an RT Ethernet infrastructure is directly supported by the integrated unit. An apparatus of this type is required for applications which require precision which is greater than the delays produced by the transit time of classic wiring.

In a further advantageous embodiment, the time server is configured for communication with a highly precise time server which is arranged between the time server and the network subscriber, wherein it is possible by the network protocol to compensate for a transit time delay between the time server and the highly precise time server. An apparatus embodied in this way may directly offer an Ethernet protocol, which takes delays on network infrastructures (for instance PTP "Precision Time Protocol", PTCP "Precision Time Control Protocol", NTP) into account. The device can be used in a highly precise manner irrespective of the wiring length actually appearing in the application and need not be compensated by for instance an error-prone flat-rate estimation. In a scenario with a highly precise, dedicated time server and protocol converter in the system, the presented Ethernet infrastructure can be used without further RT components in the integrated receiving system for RT run-time compensation, since the sub-network breaks down to form a point-to-point topology. Typical application scenarios require a structure of this type, since the highly precise time server must in most instances still perform a conversion into proprietary formats (such as for instance reference pulses).

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
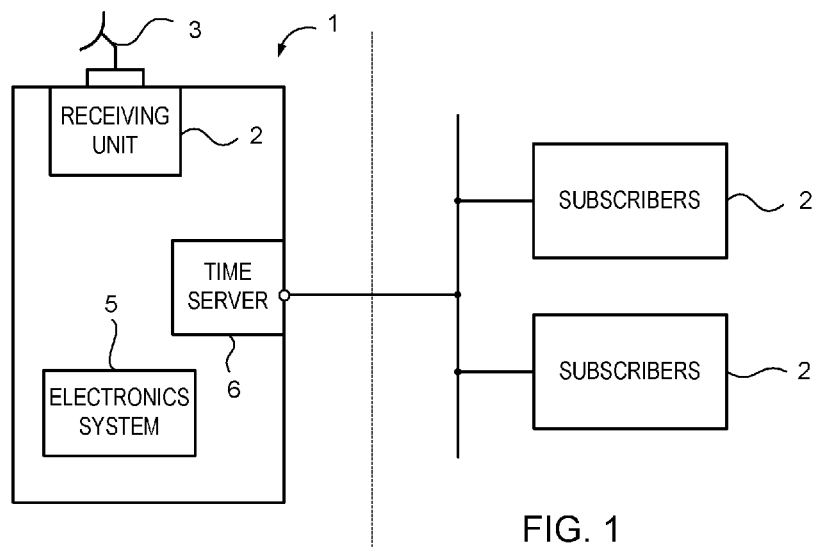
FIG. 1 is a block diagram of a simple apparatus for time synchronization

Reference will now be made in detail to the preferred embodiments, examples of which are illustrated in the accompanying drawings, wherein like reference numerals refer to like elements throughout.

FIG. 1 shows an apparatus 1 for the time synchronization of network subscribers 2 having a satellite antenna 3, a receiving unit 4 for receiving a satellite signal having time data, an electronics system 5 for obtaining a time from the satellite signal and a time server 6 with a network connection 7 for synchronization of the network subscribers 2 using a network protocol.

The apparatus 1 can be mounted externally (to the left of the dotted line) and the network subscribers 2 can be connected directly to the time server 6 via the network, which is advantageously embodied as an Ethernet. In this way, the typical coaxial connection between the satellite receiving system, which is mounted externally, and a conventional time server, which is mounted internally (typically, in a switch cabinet), is no longer required.

The exemplary embodiment shown in the Figure has an NTP server 6. The apparatus 1 can be connected directly to a Power-over-Ethernet-capable switch of the system infrastructure and can be externally mounted. The integrated antenna unit 1 therefore also assumes the tasks of a conventional NTP server. It can interfaced to the Ethernet infrastructure in a field-assembled manner. An advantage of the device is that no additional time server or protocol converter is required within the application.

Figure 2:
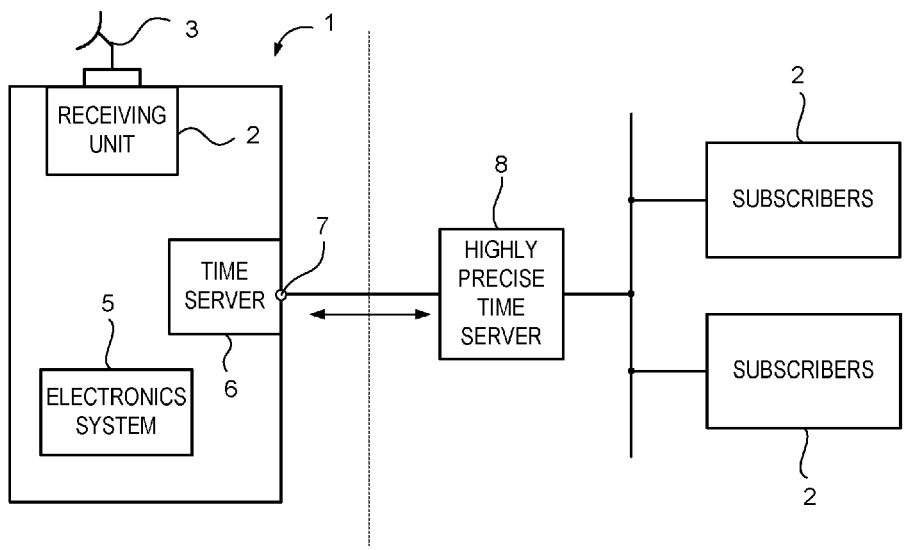
FIG. 2 is a block diagram of an embodiment with a highly precise time server.

FIG. 2 shows an exemplary embodiment with a highly precise time server 8, which is arranged between time server 6 of the apparatus 1 and the network subscribers 2, for an application which requires a precision which is higher than the delays produced by the transit time of classical wiring. A classical structure would have to measure (no standard) or estimate the wiring in order to compensate for the delay. A device 1 may directly offer an Ethernet protocol which already takes such delays on network infrastructures into account (for instance PTP, PTCP, NTP). The device 1 can be used highly precisely irrespective of the wiring length actually appearing in the application and need not be compensated by for instance an error-prone flat-rate estimation. In the scenario shown with a highly precise, dedicated time server 8 (and protocol converter) in the system, the presented Ethernet infrastructure can be used in the integrated receiving system for RT delay compensation without further RT components since the sub-network breaks down to form a point-to-point topology.

According to an exemplary embodiment (not shown), the solution can even be developed such that the RT Ethernet infrastructure is directly supported by the integrated unit 1. Typical application scenarios nevertheless require a structure as shown in this Figure, since the highly precise time server 8 must in most instances still perform a conversion into proprietary formats (such as for instance reference pulses). The solution can also be executed in the form of other communication infrastructures such as for instance E1/T1. On account of the favorable component costs, the form as an Ethernet infrastructure is however particularly advantageous.

The system described herein enables the transit times of the satellite signal produced by the wiring to be compensated highly precisely by the bidirectional form of the Ethernet infrastructure. Such a system is excellently suited to real-time applications with high demands on synchronization precision.

In summary, the apparatus provides time synchronization of network subscribers of a network based on satellites. In order to specify a simpler and more robust time synchronization of network subscribers in comparison with solutions known from the prior art, an apparatus is proposed for the time synchronization of network subscribers of a network based on satellites, including at least one satellite antenna and a receiving unit for receiving a satellite signal comprising time data, an electronics system for capturing a time from the satellite signal and a time server having a network connection for synchronization of the network subscriber using a network protocol. The complexity of the device is herewith reduced on the one hand to simply one component, and the common coaxial infrastructure between the receiving unit and the time server is no longer required on the other hand for the satellite signal and is replaced by a more robust infrastructure.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. An apparatus, connected to a Power-over-Ethernet-capable switch of system infrastructure in a network, for the time synchronization of network subscribers of the network by a highly precise time server based on satellites, comprising:
   an integrated device including
      at least one satellite antenna,
      a receiving unit receiving a satellite signal, including an item of time data, via the satellite antenna,
      an electronics system obtaining time information from the satellite signal,
      a time server having a network connection for synchronization of the network subscribers using a network protocol, configured for communication with the highly precise time server which is disposed between the integrated device and the network subscribers, the network protocol compensating for a transit time delay of wiring between the time server and the highly precise time server; and
      a power supply, connected via a network connection directly to the Power-overEthernet-capable switch of the system infrastructure, supplying power to said receiving unit; said electronics system; and said time server via connections thereto.

2. The apparatus as claimed in claim 1, wherein the network is an Ethernet.

3. The apparatus as claimed in claim 1, wherein the time server is a network time protocol server.

4. The apparatus as claimed in claim 3, wherein the time server is another highly precise time server.

* * * * *

UNITED STATES PATENT AND TRADEMARK OFFICE
CERTIFICATE OF CORRECTION

| | | |
|---|---|---|
| PATENT NO. | : 9,125,151 B2 | Page 1 of 1 |
| APPLICATION NO. | : 13/877079 | |
| DATED | : September 1, 2015 | |
| INVENTOR(S) | : Steffen Dittrich et al. | |

It is certified that error appears in the above-identified patent and that said Letters Patent is hereby corrected as shown below:

On the title page, item (54) and in the specification, Column 1, Line 1, in the title Delete "SYNCHRONIZATON" and insert --SYNCHRONIZATION--, therefor.

In the claims,

Claim 1, Column 4, Line 62

Delete "Power-overEthernet-capable" and insert --Power-over-Ethernet-capable--, therefor.

Signed and Sealed this
First Day of December, 2015

Michelle K. Lee
*Director of the United States Patent and Trademark Office*